US009456337B2

(12) United States Patent
Amerga et al.

(10) Patent No.: US 9,456,337 B2
(45) Date of Patent: Sep. 27, 2016

(54) APPARATUS AND METHOD FOR SIGNALING NETWORK CAPABILITIES FOR A WIRELESS DEVICE

(71) Applicant: QUALCOMM Incorporated, San Diego, CA (US)

(72) Inventors: Daniel Amerga, San Diego, CA (US); Qingxin Chen, Del Mar, CA (US); Srivatsa V. Chivukula, San Diego, CA (US); Thawatt Gopal, San Diego, CA (US); Krishna Rao Mandadapu, San Diego, CA (US); Nitin Pant, San Diego, CA (US); Kiran KishanRao Patil, San Diego, CA (US); Sunil Suresh Patil, San Diego, CA (US); Shyamal Ramachandran, San Diego, CA (US); Swaminathan Sureshchandran, San Diego, CA (US); Ta Yan Siu, San Diego, CA (US); Venkata G. Potnuru, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 302 days.

(21) Appl. No.: 13/842,629

(22) Filed: Mar. 15, 2013

(65) Prior Publication Data

US 2013/0260736 A1    Oct. 3, 2013

Related U.S. Application Data

(60) Provisional application No. 61/618,377, filed on Mar. 30, 2012.

(51) Int. Cl.
*H04M 3/00*    (2006.01)
*H04W 4/00*    (2009.01)
(Continued)

(52) U.S. Cl.
CPC ............... *H04W 8/22* (2013.01); *H04W 88/06* (2013.01)

(58) Field of Classification Search
CPC ... H04W 88/06; H04W 48/18; H04W 8/245; H04M 1/72525
USPC ........ 455/418–420, 432.3, 435.2, 435.3, 436
See application file for complete search history.

(56) References Cited

U.S. PATENT DOCUMENTS 8,391,239 B2    3/2013    Tenny et al.
8,620,319 B1 *  12/2013   Thandu ................. H04W 48/02
                                                  370/331
(Continued)

FOREIGN PATENT DOCUMENTS

EP    2 182 758 A2    5/2010
EP      2400790 A1    12/2011
(Continued)

OTHER PUBLICATIONS

International Search Report and Written Opinion—PCT/US2013/032824—ISA/EPO—May 27, 2013.
(Continued)

*Primary Examiner* — Dung Hong
(74) *Attorney, Agent, or Firm* — Arent Fox LLP

(57) ABSTRACT

Methods and apparatus for wireless communication in a wireless communication network include maintaining a Public Land Mobile Network (PLMN) list and receiving an information request from a network, wherein the information request is associated with configuration parameters associated with the PLMN list. Aspects of the methods and apparatus configuring the UE based on the configuration parameters associated with the PLMN list. Aspects also include replying to the network that the UE is configured with the configuration parameters associated with the PLMN list.

34 Claims, 14 Drawing Sheets

(51) Int. Cl.
*H04W 8/22* (2009.01)
*H04W 88/06* (2009.01)

(56) References Cited

U.S. PATENT DOCUMENTS

| | | | |
|---|---|---|---|
| 2006/0264217 A1* | 11/2006 | Shaheen | H04W 8/24 455/445 |
| 2007/0019575 A1 | 1/2007 | Shaheen | |
| 2007/0207815 A1* | 9/2007 | Alfano | H04W 48/04 455/456.1 |
| 2008/0064393 A1* | 3/2008 | Oommen | H04W 48/18 455/432.1 |
| 2008/0261655 A1* | 10/2008 | Carpenter | H04W 48/18 455/558 |
| 2009/0092081 A1* | 4/2009 | Balasubramanian | H04J 11/0093 370/328 |
| 2010/0091719 A1* | 4/2010 | Deshpande | H04W 8/183 370/329 |
| 2010/0105380 A1* | 4/2010 | Attar | H04W 48/16 455/434 |
| 2010/0113024 A1* | 5/2010 | Wu | H04W 36/14 455/436 |
| 2010/0267384 A1 | 10/2010 | Dwyer et al. | |
| 2011/0237269 A1* | 9/2011 | Chen | H04W 36/0088 455/450 |
| 2011/0310844 A1 | 12/2011 | Rexhepi | |
| 2012/0044869 A1 | 2/2012 | Tiwari | |
| 2012/0064883 A1* | 3/2012 | Kim | 455/422.1 |
| 2012/0077456 A1* | 3/2012 | Tiwari | 455/404.1 |
| 2012/0164979 A1 | 6/2012 | Bachmann et al. | |
| 2012/0171993 A1 | 7/2012 | Tiwari | |
| 2012/0202500 A1 | 8/2012 | Wu | |
| 2012/0270552 A1* | 10/2012 | Shi | H04W 36/0055 455/438 |
| 2014/0004862 A1* | 1/2014 | Ekemark | H04W 72/06 455/443 |

FOREIGN PATENT DOCUMENTS

| | | | | |
|---|---|---|---|---|
| WO | WO 2010145437 A1 * | 12/2010 | | H04W 36/00 |
| WO | WO-2013/089420 A1 | 6/2013 | | |

OTHER PUBLICATIONS

Renesas Mobile Europe Ltd., et al., "TDD or FDD capability in Inter Rat Handover Info", 3GPP Draft; R2-125681 UTRAN TDD or FDD in IRHOI, 3rd Generation Partnership Project (3GPP), Mobile Competence Centre; 650, Route Des Lucioles; F-06921 Sophia-Antipolis Cedex; France, vol. RAN WG2, no. New Orleans, USA; 20121112-20121116, Nov. 2, 2012, XP050667288, Retrieved from the Internet: URL:http://www.3gpp.org/ftp/tsg_ran/WG2_RL2/TSGR2_80/Docs/[retrieved on Nov. 2, 2012].

* cited by examiner

APPARATUS AND METHOD FOR SIGNALING NETWORK CAPABILITIES FOR A WIRELESS DEVICE

CLAIM OF PRIORITY UNDER 35 U.S.C §119

The present Application for Patent claims priority to U.S. Provisional Application No. 61/618,377 entitled "APPARATUS AND METHOD FOR SIGNALING NETWORK CAPABILITIES FOR A WIRELESS DEVICE" filed Mar. 30, 2012, and assigned to the assignee hereof and hereby expressly incorporated by reference.

BACKGROUND

1. Field

Aspects of the present disclosure relate generally to wireless communication systems, and more particularly, to an apparatus and method for providing a network the capabilities of a user equipment (UE), thereby improving system performance.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple UE devices. Each UE communicates with one or more base stations, such as a Node B, evolved Node B (eNB), or other access point, via transmissions on the forward and reverse links. The forward link (or downlink) refers to the communication link from the base stations to the UEs, and the reverse link (or uplink) refers to the communication link from the UEs to the base stations. This communication link may be established via a single-in-single-out, multiple-in-single-out or a multiple-in-multiple-out (MIMO) system.

UEs can be capable of operating in multiple modes to communicate with wireless networks using different radio access technologies (RAT). For example, a UE can be equipped to communicate in a third generation (3G) and a fourth generation (4G) network. In one specific example, a UE can be capable of communicating in LTE, Universal Mobile Telecommunications System (UMTS), Time Division Synchronous Code Division Multiple Access (TD-SCDMA), etc. In this example, the UE is able to process signals from the various networks, which can include using hardware designed for each RAT or adapting hardware to comply with each RAT based on the scenario. The UE, however, may not always have the opportunity to notify the network that it supports the RAT or of other related capabilities.

Thus, aspects of this apparatus and method include providing a network the capabilities of a UE, thereby improving system performance.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A method of providing a network the capabilities of a UE in a wireless communication system is offered. The method includes maintaining a Public Land Mobile Network (PLMN) list and receiving an information request from a network, wherein the information request is associated with configuration parameters associated with the PLMN list. Furthermore, the method includes configuring the UE based on the configuration parameters associated with the PLMN list. Additionally, the method includes replying to the network that the UE is configured with the configuration parameters associated with the PLMN list.

In another aspect, an apparatus of providing a network the capabilities of a UE in a wireless communication system is offered that includes a processor configured to maintain a PLMN list. Furthermore, the processor is configured to receive an information request from a network, wherein the information request is associated with configuration parameters associated with the PLMN list. Additionally, the processor is operable to configure the UE based on the configuration parameters associated with the PLMN list. Still further, the processor is configured to reply to the network that the UE is configured with the configuration parameters associated with the PLMN list.

Additionally, in another aspect, an apparatus for providing a network the capabilities of a UE in a wireless communication system includes means for maintaining a PLMN list. Furthermore, the apparatus includes means for receiving an information request from a network, wherein the information request is associated with configuration parameters associated with the PLMN list. Additionally, the apparatus includes means for configuring the UE based on the configuration parameters associated with the PLMN list. Still further, the apparatus includes means for replying to the network that the UE is configured with the configuration parameters associated with the PLMN list.

In another aspect, a computer-readable media that may include machine-executable code for providing a network the capabilities of a UE in a wireless communication system is offered that includes code for maintaining a PLMN list. Furthermore, the code may be executable for receiving an information request from a network, wherein the information request is associated with configuration parameters associated with the PLMN list. Additionally, the code may be executable for configuring the UE based on the configuration parameters associated with the PLMN list. Still further, the code may be executable for replying to the network that the UE is configured with the configuration parameters associated with the PLMN list.

These and other aspects of the disclosure will become more fully understood upon a review of the detailed description, which follows.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
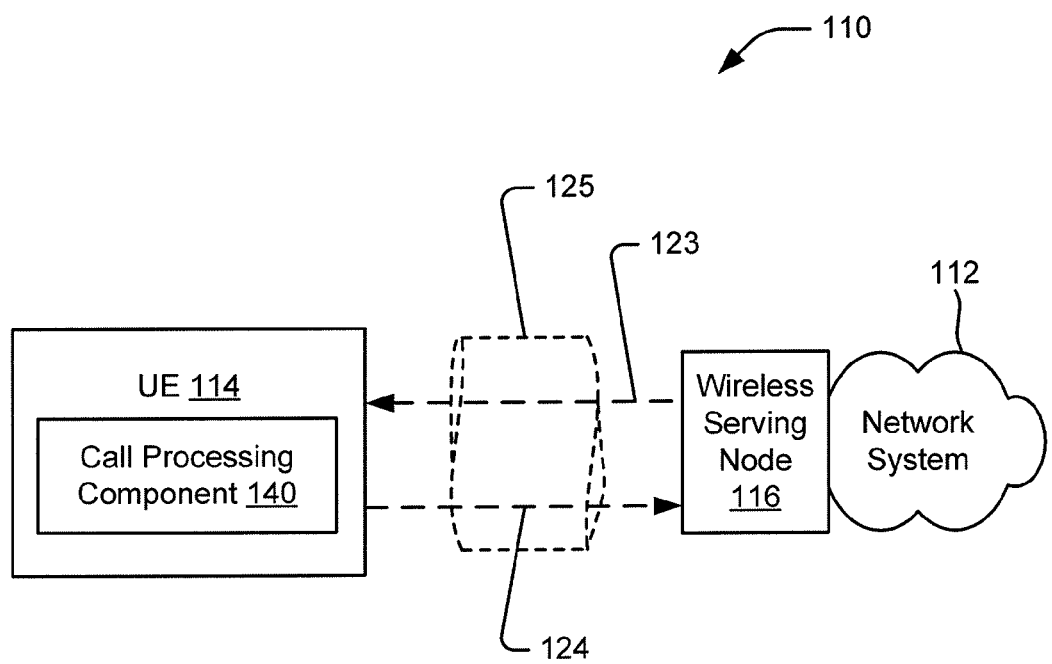
FIG. 1 is a schematic diagram illustrating an example wireless system of aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Described herein are various aspects related to signaling user equipment (UE) capabilities in a wireless network. For example, the UE can communicate with base stations in the wireless network, and can determine a type of the wireless network (e.g., a radio access technology (RAT) for indicating capabilities thereto. In a specific example, the wireless network can indicate an ambiguous network type to the UE, and thus the UE can observe signals, or one or more parameters thereof, transmitted by the base station in the wireless network to further refine the network type. The UE can accordingly communicate its capabilities to the wireless network via the base station based on the refined network type. In another example, the UE can use a previous network type in signaling capabilities.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, user equipment, or user equipment device. A wireless terminal can be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station can be utilized for communicating with wireless terminal(s) and can also be referred to as an access point, access node, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Time Division Synchronous Code Division Multiple Access (TD-SCDMA), Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, TD-SCDMA, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

As discussed above, UEs can be capable of operating in multiple modes to communicate with wireless networks using different RATs. In one specific example, a UE can be capable of communicating in LTE, UMTS, TD-SCDMA, etc., where the UE is able to process signals from the various networks, which can include using hardware designed for each RAT or adapting hardware to comply with each RAT based on the scenario. The UE, however, may not always have the opportunity to notify the network that it supports the RAT or of other related capabilities.

Generally, it is desirable for a UE to be able to inform a network that the UE is operating in about its own capabilities, including the RATs the UE supports. A UE would ideally like to inform the network that the UE supports all three RATs listed above. However, the third generation partnership project (3GPP) standards body, and consequently the LTE air interface standard, envisions UMTS and TDSCDMA to be one and the same. As a result, the messaging specified in the standard does not provide mechanisms to identify these two RATs separately/explicitly. "UTRAN" which can indicate UMTS Terrestrial Radio Access Network (UTRAN), is used to signify both TDSCDMA and UMTS, where as these two RATs differ significantly.

The substantial difference between UMTS and TDSCDMA and since the LTE network does not enable explicit differentiation of these two RATs, a potential for ambiguity may result. For example, if a UE that supports both TDSCDMA and UMTS is queried for "UTRAN" capabilities, the UE must choose one of the two capabilities to send to the network. However, the network may support UMTS or the network may support TDSCDMA and it is unclear to the UE as to what capabilities are being enquired by the network.

Thus, aspects of this apparatus and method include providing a network the capabilities of a UE, thereby improving system performance.

Referring to FIG. 1, in one aspect, a wireless communication system 110 is configured to facilitate transmitting vast amount of data from a mobile device to a network at a fast data transfer rate. Wireless communication system 110 includes at least one UE 114 that may communicate wirelessly with one or more network system 112 via serving nodes, including, but not limited to, wireless serving node 116 over one or more wireless link 125. The one or more wireless link 125, may include, but are not limited to, signaling radio bearers and/or data radio bearers. Wireless serving node 116 may be configured to transmit one or more signals 123 to UE 114 over the one or more wireless link 125, and/or UE 114 may transmit one or more signals 124 to wireless serving node 116. In an aspect, signal 123 and signal 124 may include, but are not limited to, one or more messages, such as transmitting a data packet from the UE 114 to the network via wireless serving node 116.

In an aspect, UE 114 may include a call processing component 140, which may be configured to receive configuration parameters at the wireless serving node 116 over wireless link 125. Specifically, in an aspect, call processing component 140 of UE 114, maintains a Public Land Mobile Network (PLMN) list, receives an information request from a network, configures the UE, and replies to the network.

UE 114 may comprise a mobile apparatus and may be referred to as such throughout the present disclosure. Such a mobile apparatus or UE 114 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Additionally, the one or more wireless nodes, including, but not limited to, wireless serving node 116 of wireless communication system 110, may include one or more of any type of network component, such as an access point, including a BS or node B, a relay, a peer-to-peer device, an authentication, authorization and accounting (AAA) server, a mobile switching center (MSC), a radio network controller (RNC), etc. In a further aspect, the one or more wireless serving nodes of wireless communication system 10 may include one or more small base stations, such as, but not limited to a femtocell, picocell, microcell, or any other small base station.

Figure 2:
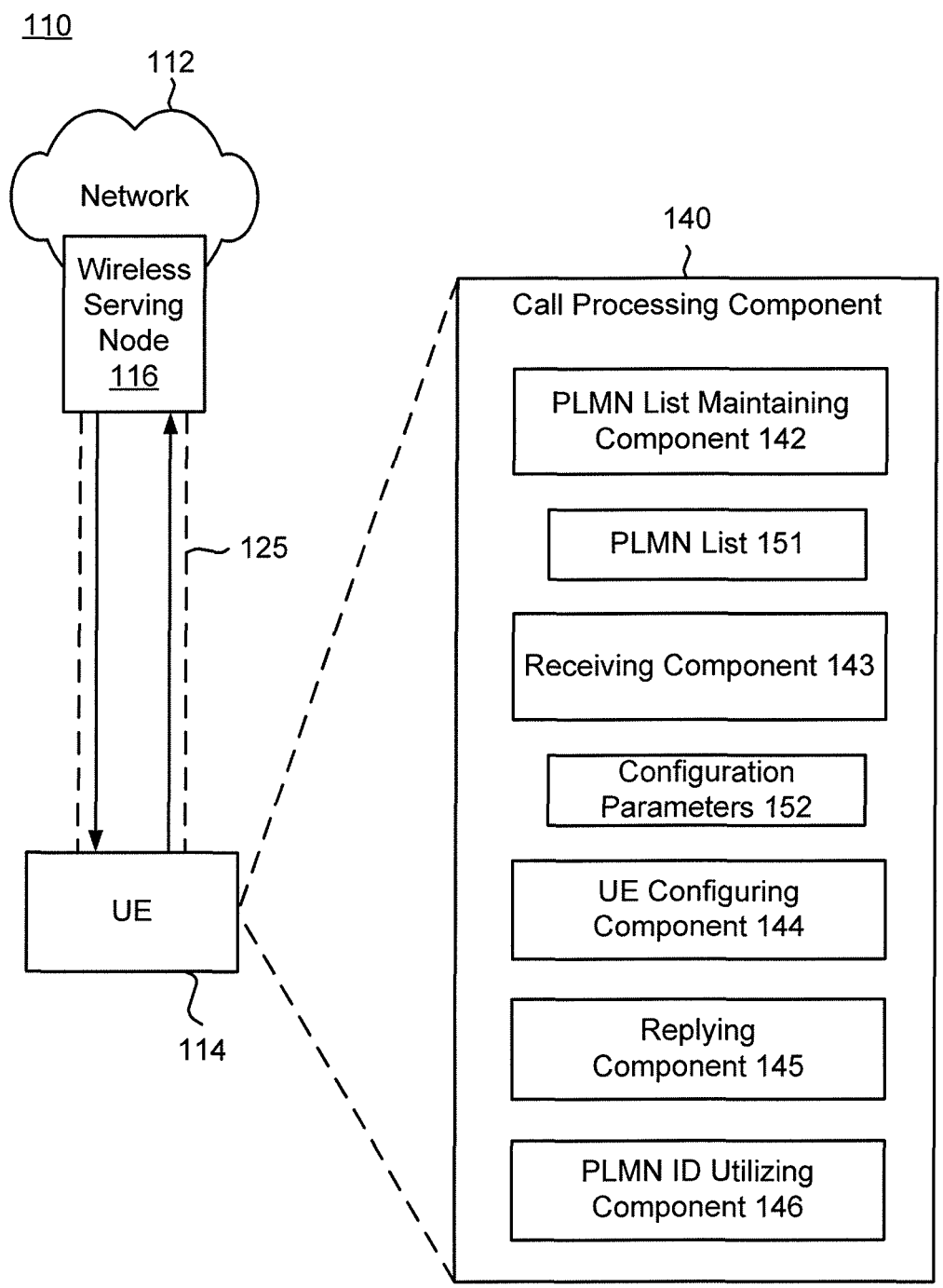
FIG. 2 is a schematic diagram illustrating exemplary aspect of call processing in a wireless communication system.

Referring to FIG. 2, in one aspect of the present apparatus and method, a wireless communication system 110 is configured to include wireless communications between network 112 and UE 114. The wireless communications system may be configured to support communications between a number of users, and FIG. 2 illustrates a manner in which wireless serving node 116, located in network 112 communicates with UE 114. The wireless communication system 110 can be configured for downlink message transmission or uplink message transmission over wireless link 125, as represented by the up/down arrows between network 112 and UE 114.

In an overall aspect, a LTE network queries a UE for it "UTRAN" capabilities. However, what capabilities the UE should indicate to the network is unclear if the UE supports both UMTS as well as TDSCDMA. As such, the UE needs to be able to determine what capabilities are likely to be most relevant to the serving LTE network (e.g., for inter-RAT (IRAT) mobility purposes, such as for LTE IRAT to either UTRA time division duplexing (TDD) or UTRA frequency division duplexing (FDD)) and appropriately include those capabilities when responding to the LTE network.

Additionally, when the UE is handed over (e.g., via packet switched handover (PSHO)) to a UTRAN target, whether the target is a UMTS cell or a TDSCDMA cell again is unclear. As such, the UE needs to make a decision locally to determine what procedures/protocol stack to invoke.

Accordingly, aspects of the present apparatus and method include a mechanism of how the UE can determine whether to include TDSCDMA capabilities or UMTS capabilities when the LTE network queries for "UTRAN" capabilities.

Indeed, the UE maintains a configurable/over-the-air (OTA) modifiable list of PLMN IDs or mobile network code (MNC) Ranges or mobile country code (MCC) ranges that indicates how an LTE network is associated with a TDSCDMA network. Upon camping on a eNB serving a LTE network that matches one or more of the entries of the above PLMN list, the UE assumes that LTE network is associated with a TDSCDMA network. Note, the relevant information, such as PLMN ID, MCC, MNC, of the serving LTE network, can be determined by monitoring and reading system information block (SIB)1 message. In addition, UE could maintain a list of LTE networks that are associated with UMTS networks.

Moreover, UE monitors and reads SIB6 message transmitted by the LTE network. If the SIB6 includes TDSCDMA neighbors, UE assumes that LTE network is associated with a TDSCDMA network. Subsequently, when queried about "UTRAN" capabilities, UE includes TDSCDMA capabilities. Once the UE has determined that the LTE network is associated with a TDSCDMA network, and updates the LTE network with TDSCMA capabilities, the UE interprets a PSHO commands directing the UE towards a "UTRAN" target to imply that the target is a TDSCDMA cell and perform procedures/stack invocation appropriately.

The UE may also identify the serving LTE band to be either LTE TDD or LTE FDD. If the UE determines that the serving LTE band is LTE TDD, the UE assumes that the LTE network is associated with a TDSCDMA network. Subsequently, when queried about "UTRAN" capabilities, the UE includes TDSCDMA capabilities. Conversely, if the UE determines that the serving LTE band is LTE FDD, the UE assumes that the LTE network is associated with a UMTS network. Subsequently, when queried about "UTRAN" capabilities, the UE includes UMTS capabilities.

In a specific aspect, within the UE 114 resides a call processing component 140. The call processing component 140 may be configured, among other things, to include a PLMN list maintaining component 142 capable of maintaining a PLMN list 151. As discussed above, the PLMN list is updateable via over the air device maintenance procedures such as an open mobile alliance device maintenance (OMA DM) protocol. In another aspect, the call processing component 140 may also be configured to include a receiving component 143 capable of receiving an information request from the network 112, wherein the information request is associated with configuration parameters 152 associated with the PLMN list 151. For example the receiving component 143, residing in UE 114, is configured to receive configuration parameters 152 associated with the PLMN list 151 from network 112 via wireless serving node 116 over link 125.

In another aspect the call processing component 140 is configured to include a UE configuring component 144 capable of configuring the UE based on the configuration parameters 152 associated with the PLMN list 151. For example, the UE configuring component 144 is operable to configure the UE 114 based on the configuration parameters 152 associated with the PLMN list 151 received from network 112 via wireless serving node 116 over link 125.

In yet another aspect, the call processing component 140 is configured to include a replying component 145 capable of replying to the network 112 that the UE 114 is configured with the configuration parameters 152 associated with the PLMN list 151. For example, the replying component 145 is configured to reply to the network 112 via wireless serving node 116 over link 125 with the configuration parameters 152 associated with the PLMN list 151.

Additionally, the call processing component 140 is configured to include PLMN ID utilizing component 146 capable of utilizing the information request and a PLMN ID of the information request to decide which configuration parameters associated with the PLMN list is used to configure the UE. In other words, UE 114 configures itself based on the information request and the PLMN ID of the information request received from the network and responds to the network based on the PLMN ID the UE is receiving the information request on.

Thus, the present apparatus and method provide a mechanism of determining UE capability based on the serving network and enabling/disabling support for one or more RATs based on attributes of the serving network. The attributes may be a PLMN ID, the contents of a neighbor list, the serving network band. Moreover, the UE may use the above discussed logic to determine whether the network is likely to be associated with a TDSCDMA network and include the two capability containers in the order TDSCDMA followed by UMTS, or else wise, in the reverse order.

Note, the UE may also keep track of the last active RAT between UMTS/WCDMA and TDSCDMA, and use that information for further certainty. The UE may also find out if the device is single-mode by looking at the supported bands, and use that to select UMTS/WCDMA or TDSCDMA.

Figure 3:
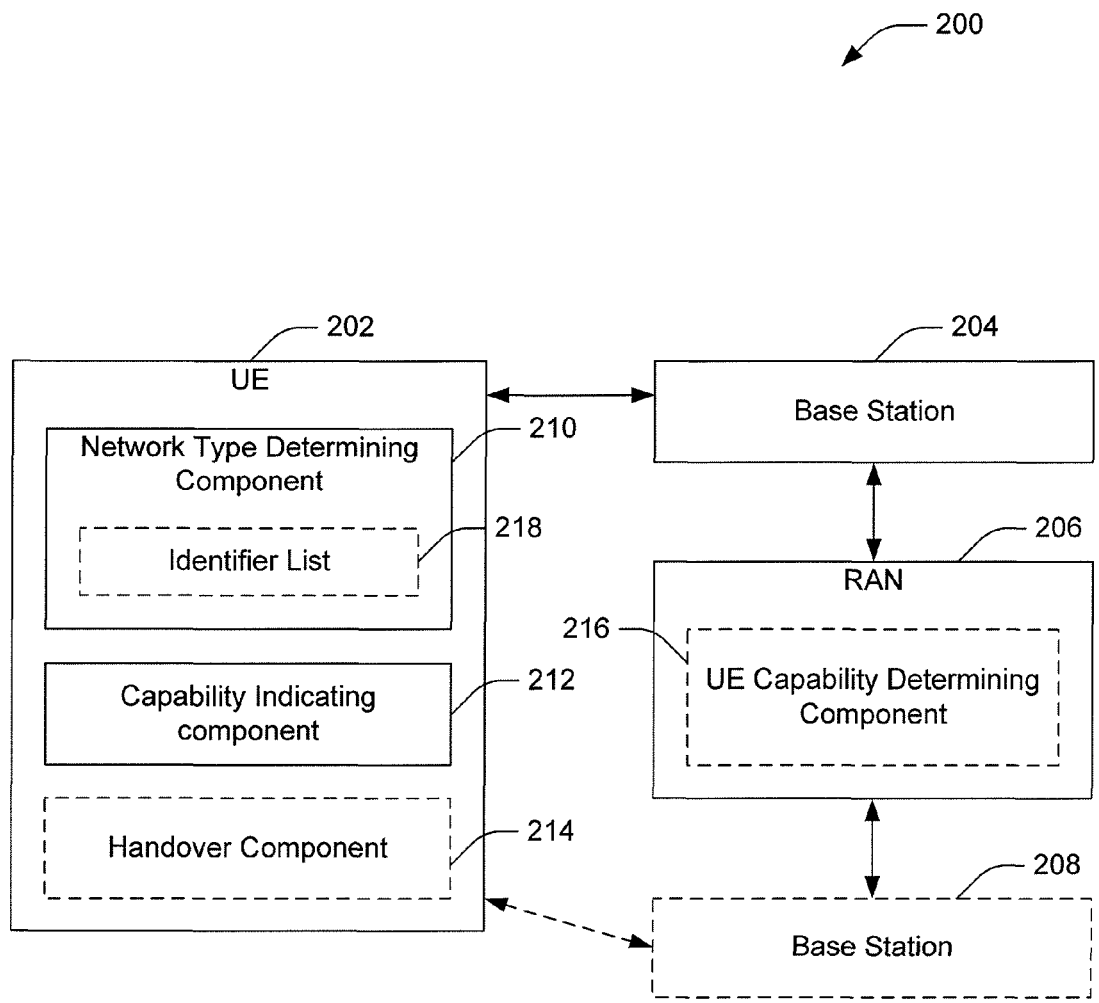
FIG. 3 illustrates an example system for communicating capability information related to multiple network types.

Referring to FIG. 3, a wireless communication system 200 is illustrated that facilitates indicating capabilities in a wireless network. System 200 includes a UE 202 that communicates with base station 204 to access a radio access network (RAN) 206. System 200 also optionally includes another base station 208 from which signals can be received. For example, UE 202 can include a mobile terminal, a modem (or other tethered device), a network listening module (NLM) in a base station, or substantially any device that can communicate with a base station. Base stations 204 and 208 can each be a macrocell, femtocell, picocell, or similar base station, a mobile base station, a relay node, a UE (e.g., communicating in peer-to-peer or ad-hoc mode with UE 202), a portion thereof, and/or the like. RAN 206 can include one or more components of a RAN, such as a radio network controller (RNC), a gateway, and/or substantially any component or collection of components that can communicate with UEs and/or determine capabilities thereof.

UE 202 includes network type determining component 210 for obtaining a type of a wireless network, a capability indicating component 212 for specifying capabilities of the UE 202 given the type of the wireless network, and an optional handover component 214 for handing over communications of UE 202 to one or more base stations and indicating capabilities based on the type of the wireless network.

RAN 206 can include a UE capability determining component 216 for determining capabilities of one or more UEs based on received capability information.

According to an example, network type determining component 210 can obtain a network type related to RAN 206. For example, one or more base stations of RAN 206, such as base station 204 or 208, can transmit overhead signals that indicate a network type. In some examples, however, the network type may not be granular enough for UE 202 to determine a mechanism for reporting capabilities. In this example, network type determining component 210 can evaluate additional communications from RAN 206 or related base stations, such as base station 204 or 208, to determine additional network type information. Such information can include a network identifier, channel information from neighboring base stations, a serving band used by the base stations 204 or 208, and/or the like.

In one example, base station 204 can broadcast an identifier related to RAN 206, such as a public land mobile network (PLMN) identifier, mobile network code (MNC), mobile country code (MCC), etc. In one example, the identifier can be broadcast by base station in an overhead message (e.g., system information block (SIB)1). Network type determining component 210 can obtain the identifier and compare it to an identifier list 218, which includes network identifiers and associated network types. Thus, where the identifier is in the identifier list 218, network type determining component 210 can determine the associated network type as indicated in the list 218.

For example, network type determining component 210 can obtain the identifier list 218 from base station 204 or another base station associated with RAN 206 or otherwise. Network type determining component 210 can obtain identifier list 218 upon registering with the RAN 206 or another RAN, upon request, etc., and/or RAN 206, or another current RAN, can communicate list 218 updates (e.g., over the air, via special programming, and/or the like) to UE 202 based on a timer, one or more events, and/or the like. In other examples, the identifier list 218 can be present on a subscriber identity module (SIM) or other configuration for the UE 202, hardcoded, or otherwise provisioned to the UE 202. For example, initial PLMN mapping to TDD capability can be {"001", "01"}. With the network configuration change and corresponding update to the UE 202, there may be additional PLMN maps to TDD capability, such as {"001", "01"} and {"001", "02"}. The list can be programmable after manufacturing to support the described network change.

In another example, network type determining component 210 can obtain a network type of RAN 206 based in part on other observed signals. For example, network type determining component 210 can monitor and read SIB messages from base station 204, which can include channel information regarding neighboring base stations, such as base station 208 (e.g., in SIB6). Network type determining component 210 can obtain the overhead messages and determine a network type of a neighboring base station, such as base station 208, based on the channel information. Network type determining component 210 can assume the base station 204 uses the same RAN 206, and thus is of the same network type as the neighboring base station.

In yet another example, network type determining component 210 can determine the network type based on a serving band of the base station 204. For example, network type determining component 210 can determine whether the serving band is time division duplexing (TDD), frequency division duplexing (FDD), etc., and can determine the network type decision based on the serving band. Further, in one example, network type determining component 210 can determine the network type as a previously determined or received network type.

In any case, once network type determining component 210 has determined the network type, capability indicating component 212 can transmit information regarding capabilities of UE 202 based on the network type. In addition, for example, handover component 214 can indicate capabilities to a target base station based on the network type as well. For instance, handover component 214, upon receiving a handover command from base station 204, can indicate capabilities to a target base station as part of the handover procedure or otherwise. Moreover, capability indicating component 212 can also indicate the determined network type in the capabilities (or by appropriately formatting the indication of capabilities). In this regard, UE capability determining component 216 can obtain capability information from the UE 202 and RAN 206 (and/or base station 204) can generate or otherwise adjust communications for the UE 202 based on the capabilities. In addition, UE capability determining component 216 can obtain the network type determined by the UE 202 based on the capability information in order to properly interpret the capability information. Furthermore, in an example, UE capability determining component 216 can query UE 202 for the capability information.

For example, capability information can include the data speed supported of the UE in certain network type, e.g., Uplink data speed (UL category), Downlink data speed (DL category), or band class support of different network types, the handover method, such as Idle Mode Reselection, Connected Mode Handover, Connected Mode Redirection, etc. Moreover, the capability information of different network type (e.g., FDD or TDD) could be different for a particular UE. Proving the capability information for multiple network types may not be intuitive at the serving base station, and hence allowing indication of capability information based on determined network type can be desirable.

In a specific example, RAN 206 can be an LTE network that indicates a network type of UMTS Terrestrial Radio Access Network (UTRAN). UE capability determining component 216 can query UE 202 for UTRAN capabilities. RAN 206, however, can be a W-CDMA, Time Division Synchronous Code Division Multiple Access (TD-SCDMA), or other UTRAN, which can accept varying capability information or formats thereof. Thus, UE 202 can send capability information appropriately to the RAN 206 based on determining the specific network type (e.g., W-CDMA, TD-SCDMA, etc.). In this regard, network type determining component 210 can determine whether the network of RAN 206 is W-CDMA, TD-SCDMA, etc. based on at least one of locating a PLMN identifier advertised by base station 204 in a PLMN identifier list 218 to determine the network type, determining whether neighboring base station channel information received in SIB6 from base station 204 relates to W-CDMA, TD-SCDMA, etc., determining whether the LTE serving band of base station 204 is FDD (which can indicate RAN 206 is W-CDMA), TDD (which can indicate RAN 206 is TD-SCDMA), and/or the like.

Capability indicating component 212 can appropriately indicate W-CDMA or TD-SCDMA capability information based on network type determining component 210 refining the network type from the received UTRAN indication. Moreover, for example, capability indicating component 212 can indicate capability information for both network types (e.g., W-CDMA and TD-SCDMA). Furthermore, capability indicating component 212 can use the order of capability information to specify the network type determined by UE 202 (e.g., W-CDMA capability information before TD-SCDMA where network type determining component 210 determines W-CDMA as the network type). In this example, UE capability determining component 216 receives the capability information from UE 202 and determines which is applicable to the network type of RAN 206. UE capability determining component 216 can then interpret the capability information in determining communications for UE 202. Moreover, UE capability determining component 216 can impact communications to UE 202 based on the determined capability information.

Figure 4:
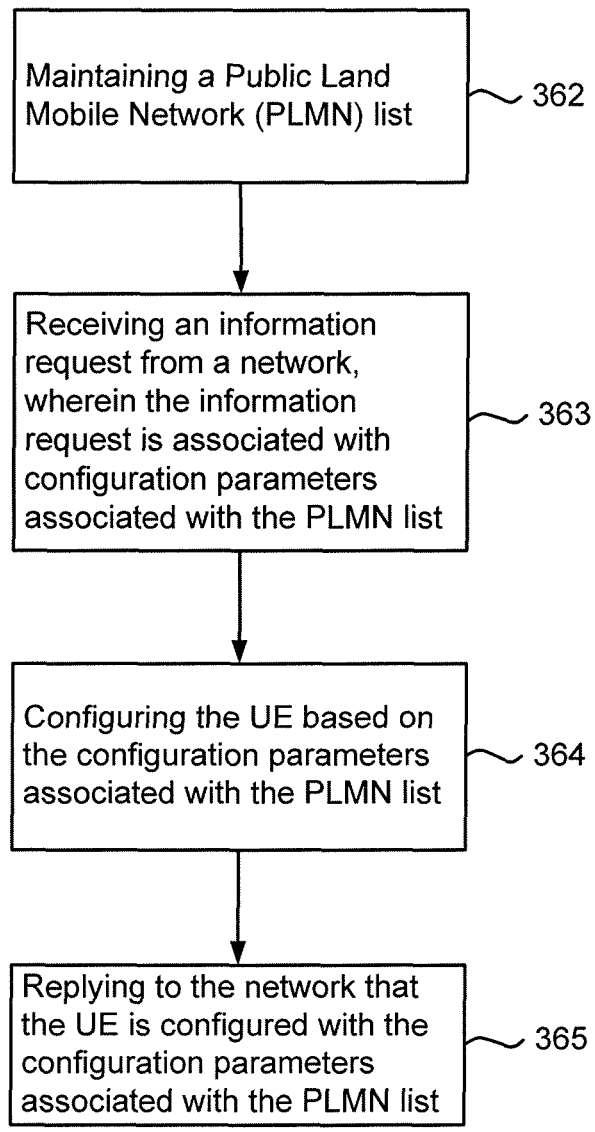
FIG. 4 is a flow diagram illustrating an exemplary method for call processing in a wireless communication system.
Figure 5:
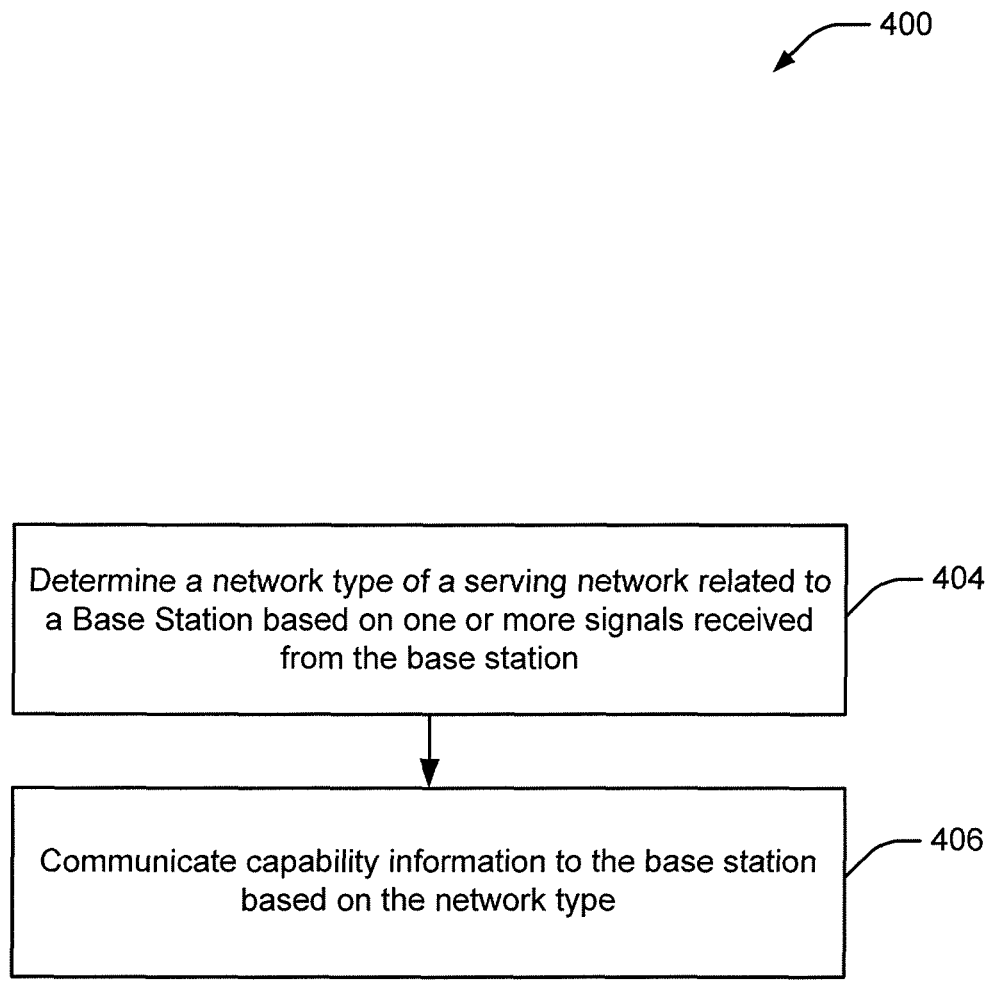
FIG. 5 illustrates another example methodology for determining a network type for communicating capability information.
Figure 6:
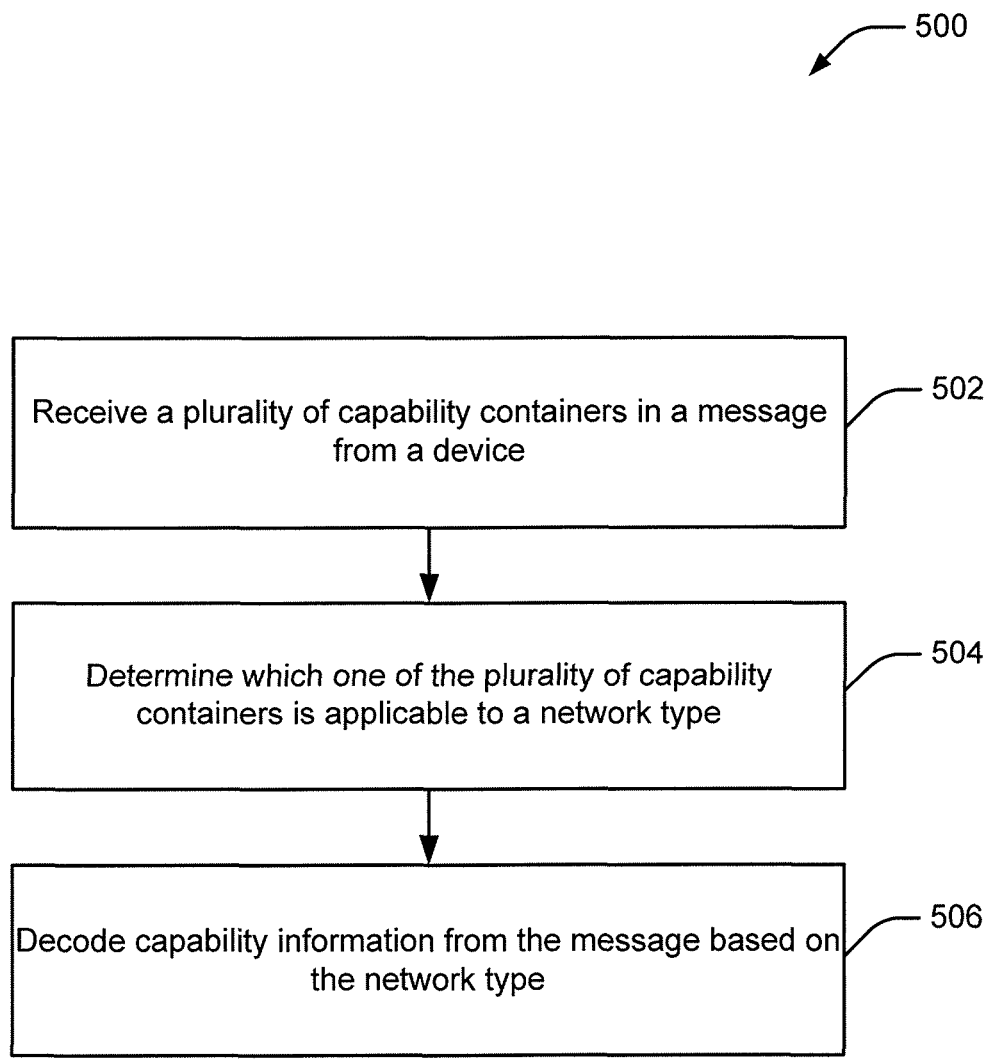
FIG. 6 illustrates yet another example methodology for decoding capability information from a UE.

Referring to FIGS. 4-6, example methodologies for communicating capability information for specific network types are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

FIG. 4 is a flow diagram illustrating an exemplary method 300. In an aspect, method 300 may be performed by a UE (e.g., UE 114 of FIG. 2), and may be performed by a processor or other component capable of executing computer-executable instructions for performing the steps of FIG. 4. In some examples, method 300 may include a UE with a call processing component 40 that may be operable to maintain a PLMN list, receive an information request from a network, configure the UE, and reply to the network that the UE has been configured.

At 362, the UE is configured for maintaining a PLMN list. For example, PLMN list maintaining component 142, residing in call processing component 140, may be configured to execute instructions for maintaining a PLMN list 151.

At 363, the UE is configured for receiving an information request from a network, wherein the information request is associated with configuration parameters associated with the PLMN list. For example, receiving component 143, residing in call processing component 140, may be configured to execute instructions for receiving configuration parameters 152 associated with the PLMN list 151 from network 112 via wireless serving node 116 over link 125.

At 364, the UE is operable for configuring the UE based on the configuration parameters associated with the PLMN list. For example, the UE configuring component 144, residing in call processing component 140, may be configured to execute instructions for configuring UE 114 based on the configuration parameters 152 associated with the PLMN list 151 received from network 112 via wireless serving node 116 over link 125.

At 365, the UE is configured for replying to the network that the UE is configured with the configuration parameters associated with the PLMN list. For example, the replying component 145, residing in call processing component 140, may be configured to execute instruction for replying to network 112 via wireless serving node 116 over link 125 with the configuration parameters 152 associated with the PLMN list 151.

Referring to FIG. 5, an example methodology 400 that facilitates communicating capability information regarding one or more network types is illustrated.

At 402, a network type of a serving network related to a base station can be determined based on receiving one or more signals from the base station. For example, this can include observing one or more parameters of such signals. For example, an identifier of the network can be determined from an overhead message and compared to a list of identifiers to network types to determine the network type. In another example, neighbor channel information broadcasted by the base station can be observed to determine a network type of neighboring base stations, and the same network type can be assumed for the base station. In yet another example, a serving band of the base station can be observed, and the network type can be determined based on the serving band. Moreover, it is to be appreciated that a request for capability information can be received from the base station, which can include a preliminary indication of network type (such as UTRAN), from which the more specific type (such as W-CDMA or TD-SCDMA) can be derived based on additional parameters.

At 406, capability information can be communicated to the base station based on the network type. In this example, the correct capability formatting and/or related information is determined based on the network type and communicated to the base station in one or more messages. In one example, this can include communicating capability information for multiple network types in separate containers, and in an example, the ordering of containers can indicate the determined network type.

Turning to FIG. 6, an example methodology 500 is shown for receiving capability information from a device.

At 502, a plurality of capability containers can be received in a message from a device. For example, the message can include the plurality of capability containers each relating to a network type, which can be a more granular type of a network type indicated to the device.

At 504, it can be determined which one of the plurality of capability containers is applicable to a network type. For example, this can be indicated explicitly in the capability container, indicated by a number of capability containers, indicated by the order of capability containers, indicated by the format of information in the capability containers, and/or the like.

At 506, capability information can be decoded from the message based on the network type. As described, once the network type is determined, the capability information can be decoded based on known formatting for the specific network type.

It will be appreciated that, in accordance with one or more aspects described herein, inferences can be made regarding determining a network type, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In an aspect, for example, the executing method 300, 400, or 500 may be UE 114 or network 112 (FIGS. 1 and 2) executing the call processing component 140 (FIGS. 1 and 2), or respective components thereof.

Figure 7:
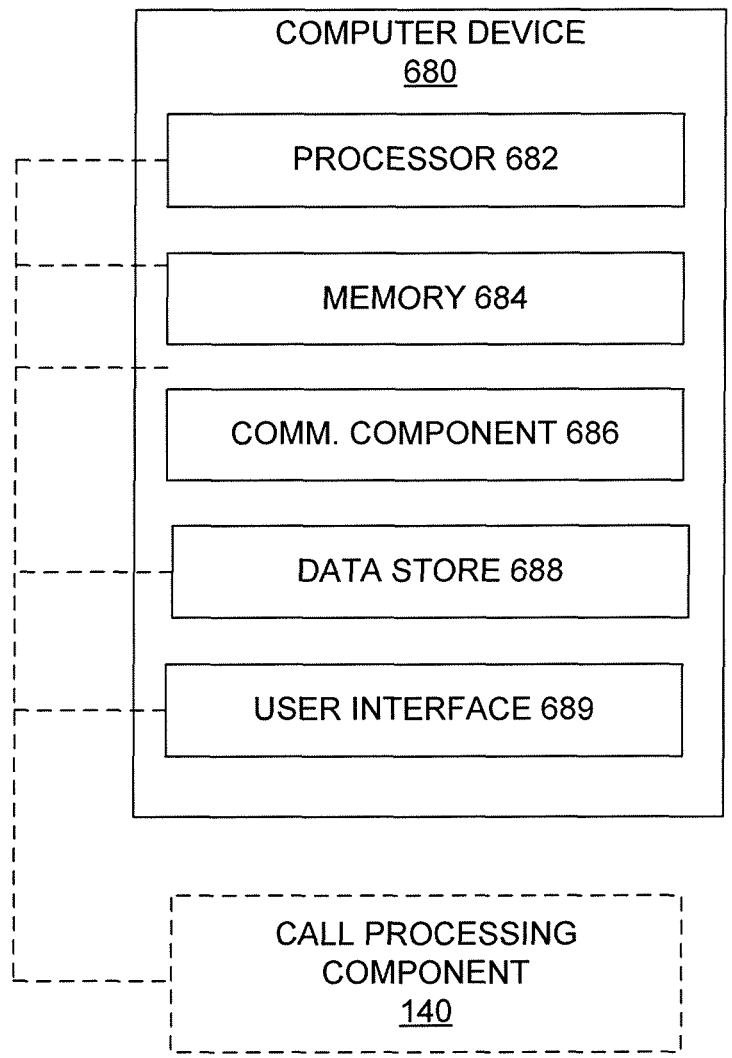
FIG. 7 is a block diagram illustrating additional example components of an aspect of a computer device having a call processing component according to the present disclosure.

Referring to FIG. 7, in one aspect, UE 114 and/or wireless serving node 116 of FIGS. 1 and/or 2 may be represented by a specially programmed or configured computer device 680, wherein the special programming or configuration includes call processing component 140, as described herein. For example, for implementation as UE 114 (FIG. 2), computer device 680 may include one or more components for computing and maintaining a PLMN list 151 or replying from a UE 114 to network 112 via wireless serving node 116, such as in specially programmed computer readable instructions or code, firmware, hardware, or some combination thereof. Computer device 680 includes a processor 682 for carrying out processing functions associated with one or more of components and functions described herein. Processor 682 can include a single or multiple set of processors or multicore processors. Moreover, processor 682 can be implemented as an integrated processing system and/or a distributed processing system.

Computer device 680 further includes a memory 684, such as for storing data used herein and/or local versions of applications being executed by processor 682. Memory 684 can include any type of memory usable by a computer, such as random access memory (RAM), read only memory (ROM), tapes, magnetic discs, optical discs, volatile memory, non-volatile memory, and any combination thereof.

Further, computer device 680 includes a communications component 686 that provides for establishing and maintaining communications with one or more parties utilizing hardware, software, and services as described herein. Communications component 686 may carry communications between components on computer device 680, as well as between computer device 680 and external devices, such as devices located across a communications network and/or devices serially or locally connected to computer device 680. For example, communications component 686 may include one or more buses, and may further include transmit chain components and receive chain components associated with a transmitter and receiver, respectively, or a transceiver, operable for interfacing with external devices. For example, in an aspect, a receiver of communications component 686 operates to receive configuration parameters 152 via a wireless serving node 116, which may be a part of memory 684. Also, for example, in an aspect, a transmitter of communications component 86 operates to transmit a reply, via the replying component 145, from UE 114 to a network 112 via a wireless serving node 116 over link 125.

Additionally, computer device 680 may further include a data store 688, which can be any suitable combination of hardware and/or software, that provides for mass storage of information, databases, and programs employed in connection with aspects described herein. For example, data store 688 may be a data repository for applications not currently being executed by processor 682.

Computer device 680 may additionally include a user interface component 689 operable to receive inputs from a user of computer device 680, and further operable to generate outputs for presentation to the user. User interface component 689 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 689 may include one or more output devices, including but not limited to a display, a speaker, a haptic feedback mechanism, a printer, any other mechanism capable of presenting an output to a user, or any combination thereof.

Furthermore, computer device 680 may include, or may be in communication with, call processing component 140, which may be configured to perform the functions described herein.

Figure 8:
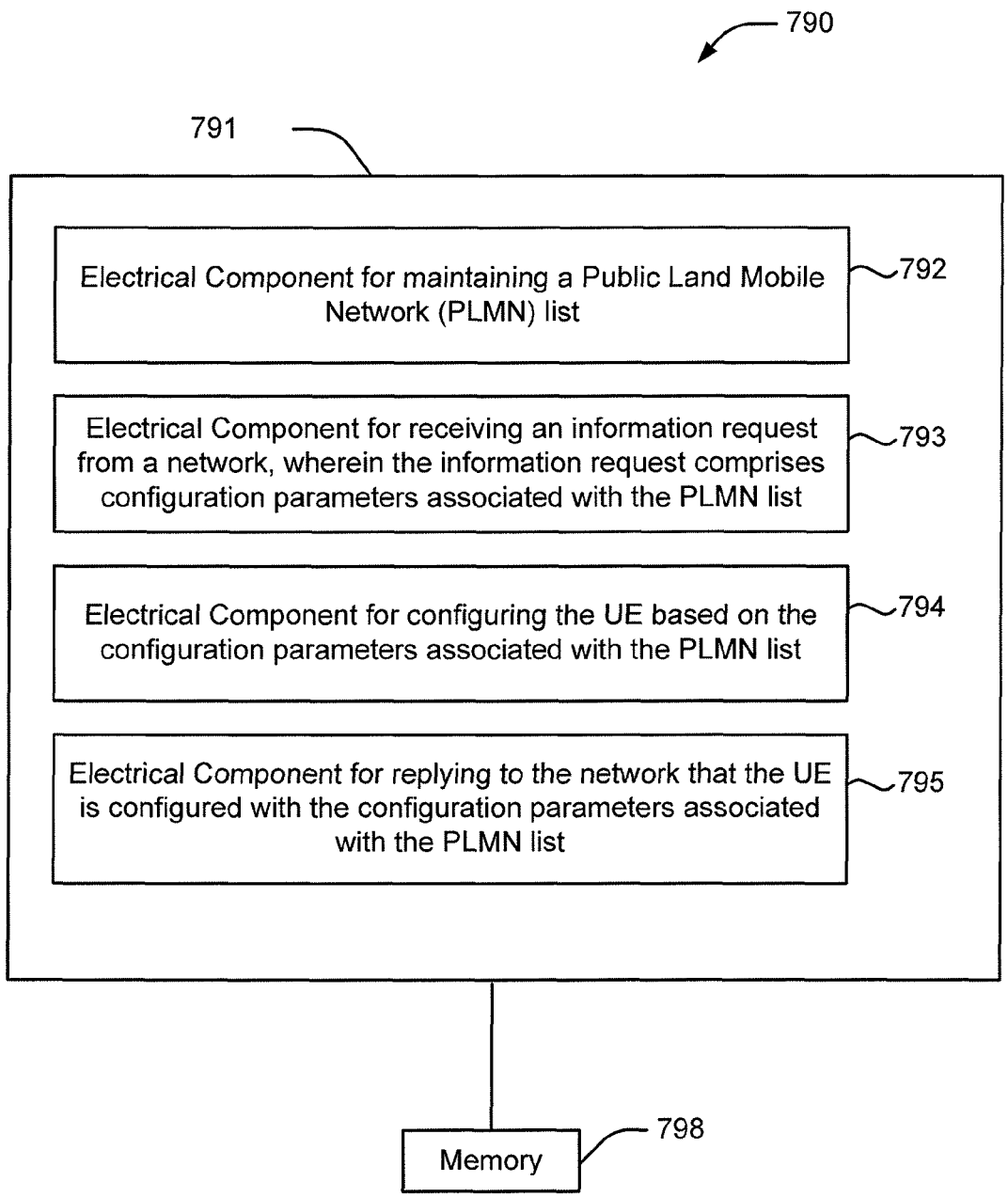
FIG. 8 is a component diagram illustrating aspects of a logical grouping of electrical components as contemplated by the present disclosure.

Referring to FIG. 8, an example system 790 is displayed for transmitting vast amount of data from a mobile device to a network. For example, system 790 can reside at least partially within UE 114 of FIGS. 1 and 2. It is to be appreciated that system 790 is represented as including functional blocks, which can be functional blocks that represent functions implemented by a processor, software, or combination thereof (e.g., firmware). For example, system 790 may be implemented via processor 682, memory 684, communications component 686, and data store 688 of FIG. 7, by for example, processor 682 executing software stored by memory 684 and/or data store 688.

Example system 790 includes a logical grouping 791 of electrical components that can act in conjunction. For instance, logical grouping 791 can include an electrical component 792 for maintaining a PLMN list. In an aspect, electrical component 792 may include PLMN list maintaining component 142 (FIG. 2).

Additionally, logical grouping 791 can include an electrical component 793 for receiving an information request from a network. In an aspect, electrical component 793 may include receiving component 143 (FIG. 2).

In an additional aspect, logical grouping 791 can include an electrical component 794 for configuring the UE based on the configuration parameters associated with the PLMN list. In an aspect, electrical component 974 may include UE configuring component 144 (FIG. 2).

Logical grouping 791 can include an electrical component 795 for replying to the network that the UE is configured with the configuration parameters associated with the PLMN list. In an aspect, electrical component 795 may include replying component 145 (FIG. 2).

Electrical components 792-795 may correspond to one or more components in FIG. 2, and such components may be separate physical components, components implemented by processor 682 (FIG. 7), or a combination thereof.

Additionally, system 790 can include a memory 798 that retains instructions for executing functions associated with the electrical components 792-795, stores data used or obtained by the electrical components 792-795, etc. While shown as being external to memory 798, it is to be understood that one or more of the electrical components 792-795 can exist within memory 798. In one example, electrical components 792-795 can comprise at least one processor, or each electrical component 792-795 can be a corresponding module of at least one processor. Moreover, in an additional or alternative example, electrical components 792-795 can be a computer program product including a computer readable medium, where each electrical component 792-795 can be corresponding code.

Figure 9:
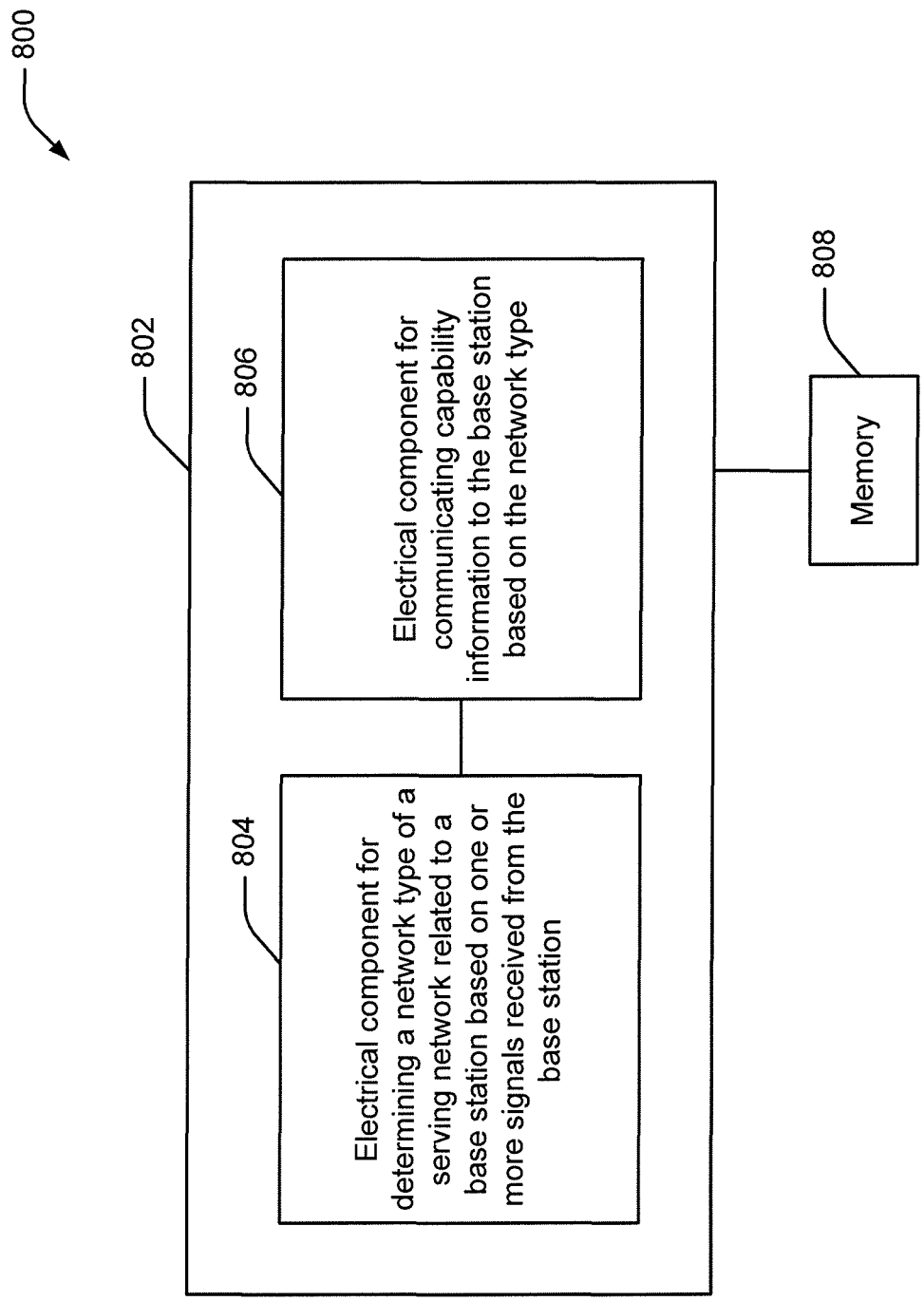
FIG. 9 is another component diagram illustrating aspects of a logical grouping of electrical components as contemplated by the present disclosure.

Turning now to FIG. 9, an example system 800 is displayed for communicating capability information. For example, system 800 can reside at least partially within a UE. It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction. For instance, logical grouping 802 can include an electrical component for determining a network type of a serving network related to a base station based on receiving one or more signals from the base station. Moreover, logical grouping 802 can include an electrical component for communicating capability information to the base station based on the network type. Moreover, electrical component 804 can include a network type determining component 210, electrical component 806 can include a capability indicating component 212, and/or the like, in one example.

Additionally, system 800 can include a memory 808 that retains instructions for executing functions associated with the electrical components 804 and 806, stores data used or obtained by the electrical components 804 and 806, etc. While shown as being external to memory 808, it is to be understood that one or more of the electrical components 804 and 806 can exist within memory 808. In one example, electrical components 804 and 806 can comprise at least one processor, or each electrical component 804 and 806 can be a corresponding module of at least one processor. Moreover, in an additional or alternative example, electrical components 804 and 806 can be a computer program product including a computer readable medium, where each electrical component 804 and 806 can be corresponding code.

Figure 10:
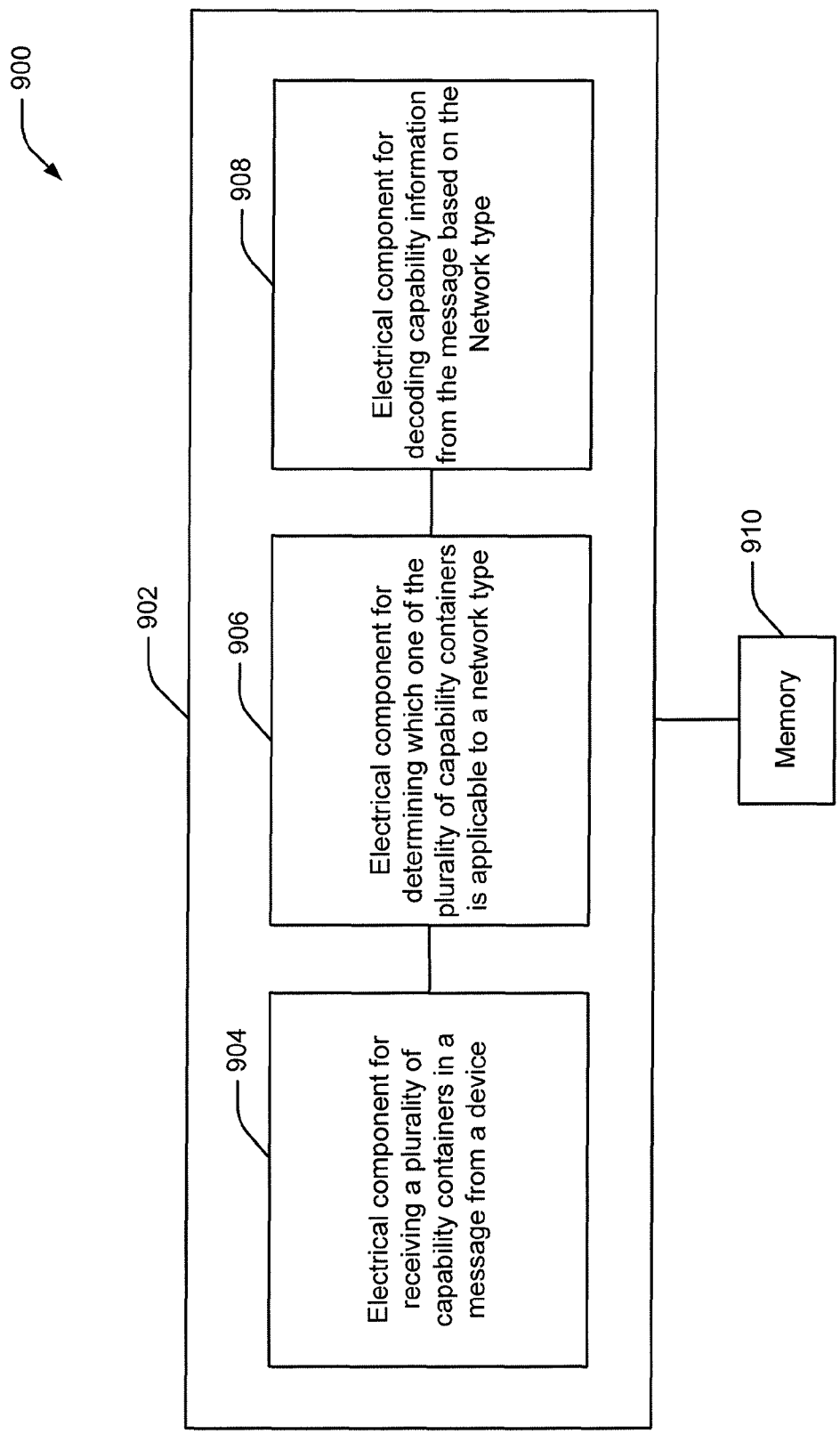
FIG. 10 is yet another component diagram illustrating aspects of a logical grouping of electrical components as contemplated by the present disclosure.

Turning now to FIG. 10, an example system 900 is displayed for decoding capability information from a device. For example, system 900 can reside at least partially within a network component. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for receiving a plurality of capability containers in a message from a device.

Moreover, logical grouping 902 can include an electrical component for determining which one of the plurality of capability containers is applicable to a network type. Logical grouping 902 can also include an electrical component for decoding capability information from the message based on the network type.

Moreover, electrical components 904, 906, and/or 908 can include a UE capability determining component 216, for example, or one or more processors, transceivers, etc. Additionally, system 900 can include a memory 910 that retains instructions for executing functions associated with the electrical components 904, 906, and 908, stores data used or obtained by the electrical components 904, 906, 908, etc. While shown as being external to memory 910, it is to be understood that one or more of the electrical components 904, 906, and 908 can exist within memory 910. In one example, electrical components 904, 906, and 908 can comprise at least one processor, or each electrical component 904, 906, and 908 can be a corresponding module of at least one processor. Moreover, in an additional or alternative example, electrical components 904, 906, and 908 can be a computer program product including a computer readable medium, where each electrical component 904, 906, and 908 can be corresponding code.

Figure 11:
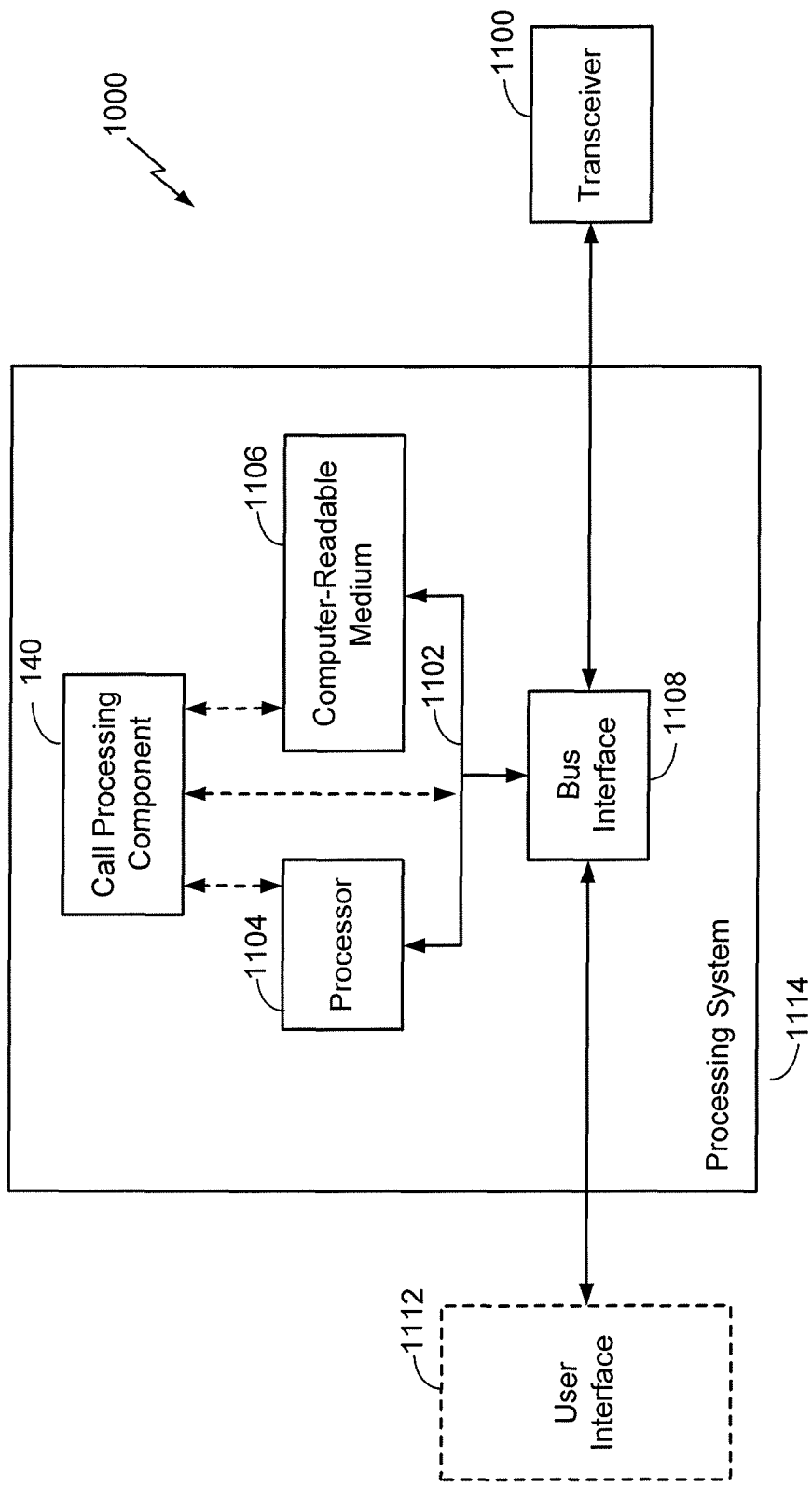
FIG. 11 is a block diagram illustrating an example of a hardware implementation for an apparatus employing a processing system to perform the functions described herein.

FIG. 11 is a block diagram illustrating an example of a hardware implementation for an apparatus 1000 employing a processing system 1114. Apparatus 1000 may be configured to include, for example, wireless device 110 (FIGS. 1 and 2) and/or call processing component 140 (FIGS. 1 and 2) implementing the components described above, such as, but not limited to the PLMN list maintaining component 142, receiving component 143, UE configuring component 144, and replying component 145, as described above. In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 links together various circuits including one or more processors, represented generally by the processor 1104, and computer-readable media, represented generally by the computer-readable medium 1106. The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110. The transceiver 1110 provides a means for communicating with various other apparatus over a transmission medium. Depending upon the nature of the apparatus, a user interface 1112 (e.g., keypad, display, speaker, microphone, joystick) may also be provided.

The processor 1104 is responsible for managing the bus 1102 and general processing, including the execution of software stored on the computer-readable medium 1106. The software, when executed by the processor 1104, causes the processing system 1114 to perform the various functions described infra for any particular apparatus. The computer-readable medium 1106 may also be used for storing data that is manipulated by the processor 1104 when executing software.

In an aspect, processor 1104, computer-readable medium 1106, or a combination of both may be configured or otherwise specially programmed to perform the functionality of the call processing component 140 (FIGS. 1 and 2) as described herein.

The various concepts presented throughout this disclosure may be implemented across a broad variety of telecommunication systems, network architectures, and communication standards.

Figure 12:
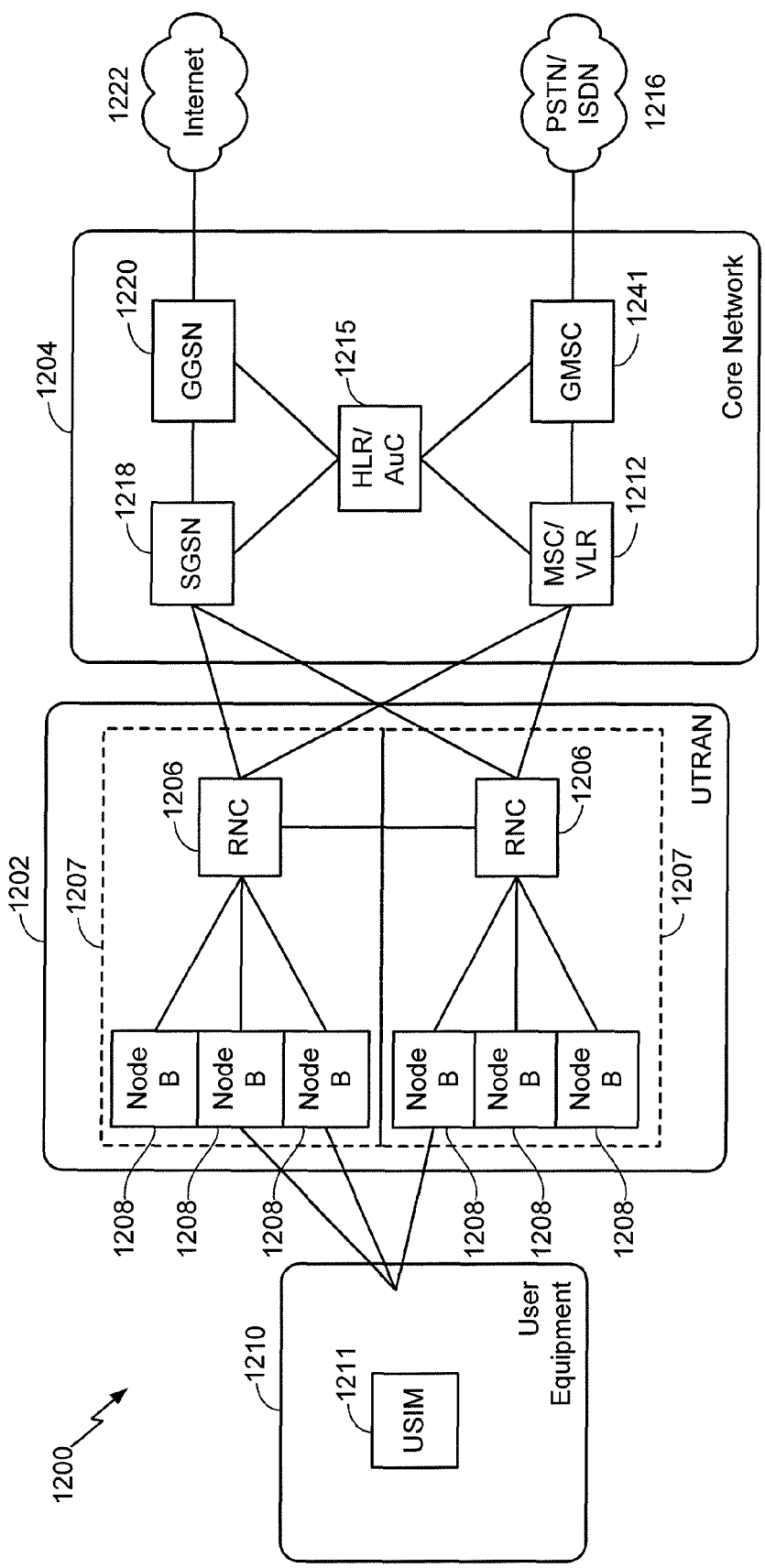
FIG. 12 is a block diagram conceptually illustrating an example of a telecommunications system including a UE configured to perform the functions described herein.

Referring to FIG. 12, by way of example and without limitation, the aspects of the present disclosure are presented with reference to a UMTS system 1200 employing a W-CDMA air interface. A UMTS network includes three interacting domains: a Core Network (CN) 1204, a UMTS Terrestrial Radio Access Network (UTRAN) 1202, and User Equipment (UE) 1210. UE 1210 may be configured to include, for example, the call processing component 140 (FIGS. 1 and 2) implementing the components described above, such as, but not limited to the PLMN list maintaining component 142, receiving component 143, UE configuring component 144, and replying component 145. In this example, the UTRAN 1202 provides various wireless services including telephony, video, data, messaging, broadcasts, and/or other services. The UTRAN 1202 may include a plurality of Radio Network Subsystems (RNSs) such as an RNS 1207, each controlled by a respective Radio Network Controller (RNC) such as an RNC 1206. Here, the UTRAN 1202 may include any number of RNCs 1206 and RNSs 1207 in addition to the RNCs 1206 and RNSs 1207 illustrated herein. The RNC 1206 is an apparatus responsible for, among other things, assigning, reconfiguring and releasing radio resources within the RNS 1207. The RNC 1206 may be interconnected to other RNCs (not shown) in the UTRAN 1202 through various types of interfaces such as a direct physical connection, a virtual network, or the like, using any suitable transport network.

Communication between a UE 1210 and a Node B 1208 may be considered as including a physical (PHY) layer and a medium access control (MAC) layer. Further, communication between a UE 1210 and an RNC 1206 by way of a respective Node B 1208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331, incorporated herein by reference.

The geographic region covered by the RNS 1207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 1208 are shown in each RNS 1207; however, the RNSs 1207 may include any number of wireless Node Bs. The Node Bs 1208 provide wireless access points to a CN 1204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The UE 1210 is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 1210 may further include a universal subscriber identity module (USIM) 1211, which contains a user's subscription information to a network. For illustrative purposes, one UE 1210 is shown in communication with a number of the Node Bs 1208. The DL, also called the forward link, refers to the communication link from a Node B 1208 to a UE 1210, and the UL, also called the reverse link, refers to the communication link from a UE 1210 to a Node B 1208.

The CN 1204 interfaces with one or more access networks, such as the UTRAN 1202. As shown, the CN 1204 is a GSM core network. However, as those skilled in the art will recognize, the various concepts presented throughout this disclosure may be implemented in a RAN, or other suitable access network, to provide UEs with access to types of CNs other than GSM networks.

The CN 1204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 1204 supports circuit-switched services with a MSC 1212 and a GMSC 1214. In some applications, the GMSC 1214 may be referred to as a media gateway (MGW). One or more RNCs, such as the RNC 1206, may be connected to the MSC 1212. The MSC 1212 is an apparatus that controls call setup, call routing, and UE mobility functions. The MSC 1212 also includes a VLR that contains subscriber-related information for the duration that a UE is in the coverage area of the MSC 1212. The GMSC 1214 provides a gateway through the MSC 1212 for the UE to access a circuit-switched network 1216. The GMSC 1214 includes a home location register (HLR) 1215 containing subscriber data, such as the data reflecting the details of the services to which a particular user has subscribed. The HLR is also associated with an authentication center (AuC) that contains subscriber-specific authentication data. When a call is received for a particular UE, the GMSC 1214 queries the HLR 1215 to determine the UE's location and forwards the call to the particular MSC serving that location.

The CN 1204 also supports packet-data services with a serving GPRS support node (SGSN) 1218 and a gateway GPRS support node (GGSN) 1220. GPRS, which stands for General Packet Radio Service, is designed to provide packet-data services at speeds higher than those available with standard circuit-switched data services. The GGSN 1220 provides a connection for the UTRAN 1202 to a packet-based network 1222. The packet-based network 1222 may be the Internet, a private data network, or some other suitable packet-based network. The primary function of the GGSN 1220 is to provide the UEs 1210 with packet-based network connectivity. Data packets may be transferred between the GGSN 1220 and the UEs 1210 through the SGSN 1218, which performs primarily the same functions in the packet-based domain as the MSC 1212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 1208 and a UE 1210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 1210 provides feedback to the node B 1208 over the HS-DPCCH to indicate whether it correctly decoded a packet on the downlink.

HS-DPCCH further includes feedback signaling from the UE 1210 to assist the node B 1208 in taking the right decision in terms of modulation and coding scheme and precoding weight selection, this feedback signaling including the CQI and PCI.

HSPA Evolved" or HSPA+ is an evolution of the HSPA standard that includes MIMO and 64-QAM, enabling increased throughput and higher performance. That is, in an aspect of the disclosure, the node B 1208 and/or the UE 1210 may have multiple antennas supporting MIMO technology. The use of MIMO technology enables the node B 1208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multi-path fading and increase transmission quality, and spatial multiplexing gains to increase data throughput.

Spatial multiplexing may be used to transmit different streams of data simultaneously on the same frequency. The data steams may be transmitted to a single UE 1210 to increase the data rate, or to multiple UEs 1210 to increase the overall system capacity. This is achieved by spatially precoding each data stream and then transmitting each spatially precoded stream through a different transmit antenna on the downlink. The spatially precoded data streams arrive at the UE(s) 1210 with different spatial signatures, which enables each of the UE(s) 1210 to recover the one or more the data streams destined for that UE 1210. On the uplink, each UE 1210 may transmit one or more spatially precoded data streams, which enables the node B 1208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 13:
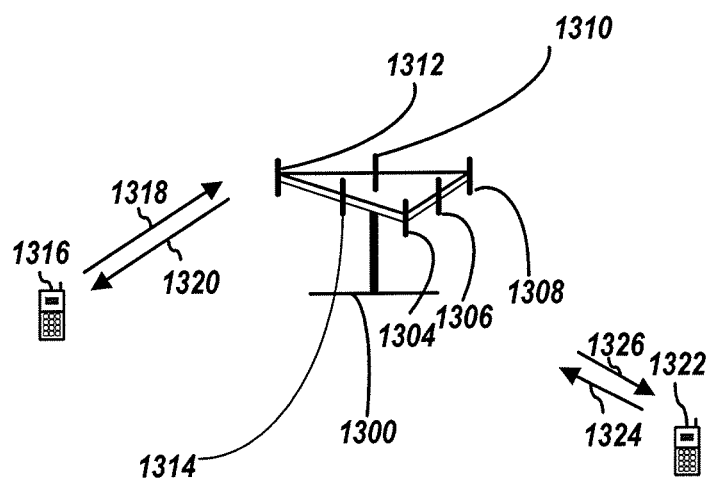
FIG. 13 illustrates a multiple access wireless communication system according to one embodiment.

Referring to FIG. 13, a multiple access wireless communication system according to one embodiment is illustrated. An access point 1300 (AP) includes multiple antenna groups, one including 1304 and 1306, another including 1308 and 1310, and an additional including 1312 and 1314. In FIG. 13, only two antennas are shown for each antenna group, however, more or fewer antennas can be utilized for each antenna group. Access terminal 1316 (AT) is in communication with antennas 1312 and 1314, where antennas 1312 and 1314 transmit information to access terminal 1316 over forward link 1320 and receive information from access terminal 1316 over reverse link 1318. Access terminal 1322 is in communication with antennas 1304 and 1306, where antennas 1304 and 1306 transmit information to access terminal 1322 over forward link 1326 and receive information from access terminal 1322 over reverse link 1324. In a FDD system, communication links 1318, 1320, 1324 and 1326 can use different frequency for communication. For example, forward link 1320 can use a different frequency then that used by reverse link 1318.

Each group of antennas and/or the area in which they are designed to communicate is often referred to as a sector of the access point. In the embodiment, antenna groups each are designed to communicate to access terminals in a sector of the areas covered by access point 1300.

In communication over forward links 1320 and 1326, the transmitting antennas of access point 1300 utilize beamforming in order to improve the signal-to-noise ratio of forward links for the different access terminals 1316 and 1322. Also, an access point using beamforming to transmit to access terminals scattered randomly through its coverage causes less interference to access terminals in neighboring cells than an access point transmitting through a single antenna to all its access terminals.

Moreover, access terminals 1316 and 1322 can provide functionality to determine a network type of access point 1300 for communicating capability information thereto, as described above.

Figure 14:
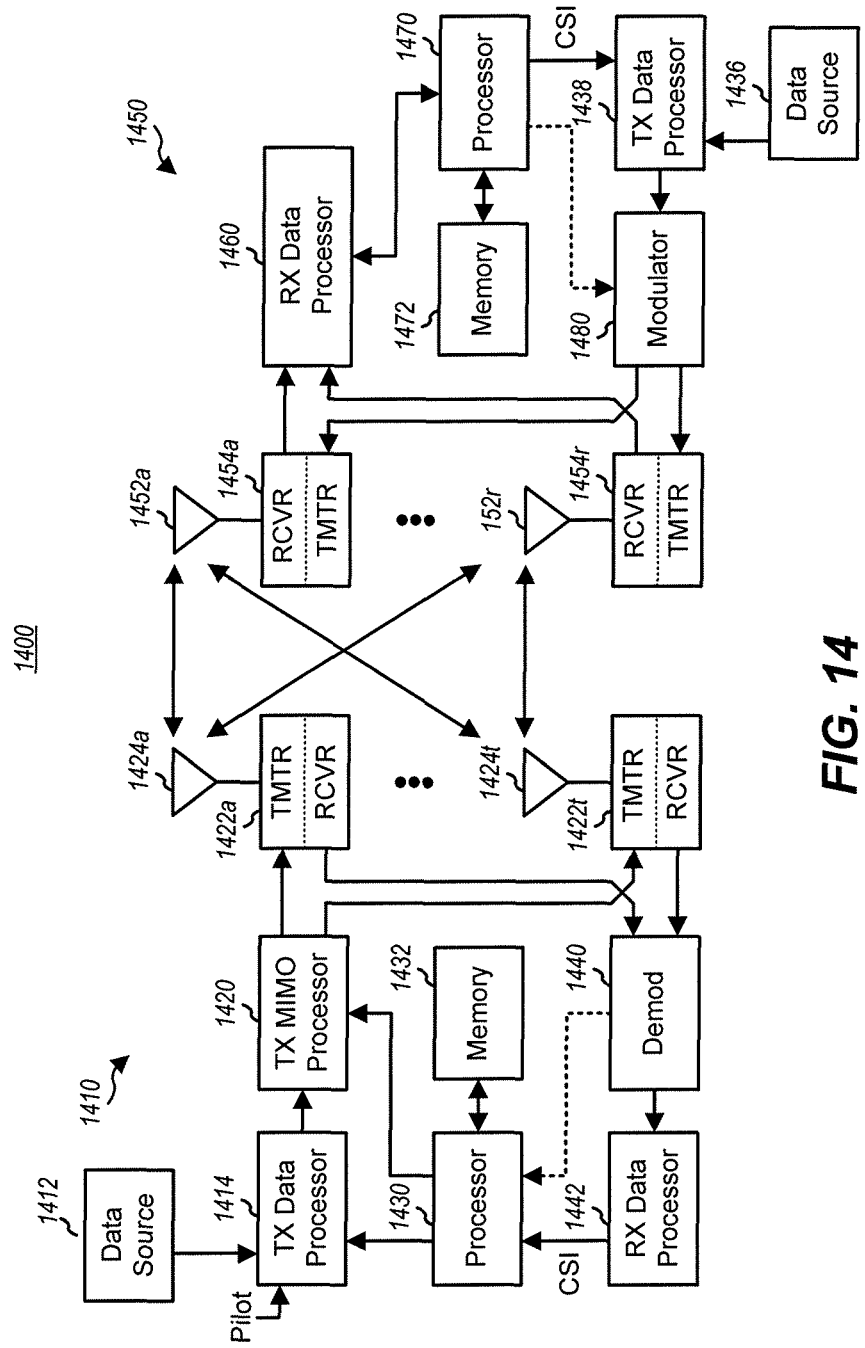
FIG. 14 illustrates a block diagram of a communication system.

FIG. 14 is a block diagram of an embodiment of a transmitter system 1410 (also known as the access point) and a receiver system 1450 (also known as access terminal) in a MIMO system 1400. At the transmitter system 1410, traffic data for a number of data streams is provided from a data source 1412 to a transmit (TX) data processor 1414. In addition, it is to be appreciated that transmitter system 1410 and/or receiver system 1450 can employ the systems (FIGS. 1-3) and/or methods (FIGS. 4-6) described herein to facilitate wireless communication there between. For example, components or functions of the systems and/or methods described herein can be part of a memory 1432 and/or 1472 or processors 1430 and/or 1470 described below, and/or can be executed by processors 1430 and/or 1470 to perform the disclosed functions.

In an embodiment, each data stream is transmitted over a respective transmit antenna. TX data processor 1414 formats, codes, and interleaves the traffic data for each data stream based on a particular coding scheme selected for that data stream to provide coded data.

The coded data for each data stream can be multiplexed with pilot data using OFDM techniques. The pilot data is typically a known data pattern that is processed in a known manner and can be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream can be determined by instructions performed by processor 1430.

The modulation symbols for all data streams are then provided to a TX MIMO processor 1420, which can further process the modulation symbols (e.g., for OFDM). TX MIMO processor 1420 then provides $N_T$ modulation symbol streams to $N_T$ transmitters (TMTR) 1422a through 1422t. In certain embodiments, TX MIMO processor 1420 applies beamforming weights to the symbols of the data streams and to the antenna from which the symbol is being transmitted.

Each transmitter 1422 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 1422a through 1422t are then transmitted from $N_T$ antennas 1424a through 1424t, respectively.

At receiver system 1450, the transmitted modulated signals are received by $N_R$ antennas 1452a through 1452r and the received signal from each antenna 1452 is provided to a respective receiver (RCVR) 1454a through 1454r. Each receiver 1454 conditions (e.g., filters, amplifies, and downconverts) a respective received signal, digitizes the conditioned signal to provide samples, and further processes the samples to provide a corresponding "received" symbol stream.

An RX data processor 1460 then receives and processes the $N_R$ received symbol streams from $N_R$ receivers 1454 based on a particular receiver processing technique to provide $N_T$ "detected" symbol streams. The RX data processor 1460 then demodulates, deinterleaves, and decodes each detected symbol stream to recover the traffic data for the data stream. The processing by RX data processor 1460 is complementary to that performed by TX MIMO processor 1420 and TX data processor 1414 at transmitter system 1410.

A processor 1470 periodically determines which precoding matrix to use. Processor 1470 formulates a reverse link message comprising a matrix index portion and a rank value portion.

The reverse link message can comprise various types of information regarding the communication link and/or the received data stream. The reverse link message is then processed by a TX data processor 1438, which also receives traffic data for a number of data streams from a data source 1436, modulated by a modulator 1480, conditioned by transmitters 1454a through 1454r, and transmitted back to transmitter system 1410.

At transmitter system 1410, the modulated signals from receiver system 1450 are received by antennas 1424, conditioned by receivers 1422, demodulated by a demodulator 1440, and processed by a RX data processor 1442 to extract the reserve link message transmitted by the receiver system 1450. Processor 1430 then determines which pre-coding matrix to use for determining the beamforming weights then processes the extracted message.

Processors 1430 and 1470 can direct (e.g., control, coordinate, manage, etc.) operation at transmitter system 1410 and receiver system 1450, respectively. Respective processors 1430 and 1470 can be associated with memory 1432 and 1472 that store program codes and data. For example, processors 1430 and 1470 can perform functions described herein with respect to improving QoE for an application at a UE, and/or can operate one or more of the corresponding components. Similarly, memory 1432 and 1472 can store instructions for communicating capability information for multiple network types.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of wireless communications, comprising:
   maintaining, at a user equipment (UE), a Public Land Mobile Network (PLMN) list;
   receiving an information request from a network, wherein the information request queries the UE for network capabilities supported by the UE;
   receiving an indication associated with a Universal Mobile Telecommunications System (UMTS) Terrestrial Radio Access Network (UTRAN) network type from the network;
   in response to receiving the information request or the indication from the network, determining a type of radio access technology (RAT) supported by the network based on the PLMN list; and
   replying to the network with first network capabilities from multiple network capabilities supported by the UE, wherein the first network capabilities are associated with the type of RAT supported by the network, and wherein the multiple network capabilities supported by the UE include at least Time Division Synchronous Code Division Multiple Access (TDSCDMA) network capabilities or Wideband Code Division Multiple Access (WCDMA) network capabilities.

2. The method of claim 1, wherein the information request includes neighbor channel information received in a system block.

3. The method of claim 1, wherein the information request includes information indicating a presence of a Time Division Synchronous Code Division Multiple Access (TD-SCDMA) network or a Universal Mobile Telecommunications System (UMTS) network.

4. The method of claim 1, wherein the type of RAT supported by the network is determined based on neighbor channel information received in a system information block, and the determining the network type is based on the neighbor channel information.

5. The method of claim 1, wherein the determining the type of RAT supported by the network is based in part on determining whether the network uses time division duplexing or frequency division duplexing.

6. The method of claim 1, further comprising receiving a command to handover to a target base station, and determining that the target base station supports the type of RAT supported by the network for communicating capabilities thereto.

7. The method of claim 1, where the type of RAT supported by the network is determined based on a previous network type of a last RAT.

8. The method of claim 1, wherein the PLMN list is updateable via over the air device maintenance procedures such as an open mobile alliance device maintenance protocol (OMA DM).

9. The method of claim 1, further comprising comparing an identifier (ID) of the network with one or more entries of the PLMN list to determine the type of RAT supported by the network.

10. The method of claim 1, further comprising:
 receiving, at the UE, at least one system information block (SIB) message; and
 determining, at the UE, the type of RAT supported by the network based on the received SIB message.

11. An apparatus for wireless communications, comprising:
 at least one processor; and
 a memory couple to the at least one processor, wherein the at least one processor is configured to:
 maintain, at a user equipment (UE), a Public Land Mobile Network (PLMN) list;
 receive an information request from a network, wherein the information request queries the UE for network capabilities supported by the UE;
 receive an indication associated with a Universal Mobile Telecommunications System (UMTS) Terrestrial Radio Access Network (UTRAN) network type from the network;
 in response to the information request or the indication from the network, determine a type of radio access technology (RAT) supported by the network based on the PLMN list; and
 reply to the network with first network capabilities from multiple network capabilities supported by the UE, wherein the first network capabilities are associated with the type of RAT supported by the network, and wherein the multiple network capabilities supported by the UE include at least Time Division Synchronous Code Division Multiple Access (TDSCDMA) network capabilities or Wideband Code Division Multiple Access (WCDMA) network capabilities.

12. The apparatus of claim 11, wherein the information request includes neighbor channel information received in a system block.

13. The apparatus of claim 11, wherein the information request includes information indicating a presence of a Time Division Synchronous Code Division Multiple Access (TD-SCDMA) network or a Universal Mobile Telecommunications System (UMTS) network.

14. The apparatus of claim 11, wherein the type of RAT supported by the network is determined based on neighbor channel information received in a system information block, and the determining the network type is based on the neighbor channel information.

15. The apparatus of claim 11, wherein the type of RAT supported by the network is determined based in part on determining whether the network uses time division duplexing or frequency division duplexing.

16. The apparatus of claim 11, wherein the processor is further configured to receive a command to handover to a target base station, and determine that the target base station supports the type of RAT supported by the network for communicating capabilities thereto.

17. The apparatus of claim 11, where the type of RAT supported by the network is determined based on a previous network type of a last RAT.

18. The apparatus of claim 11, wherein the PLMN list is updateable via over the air device maintenance procedures such as an open mobile alliance device maintenance protocol (OMA DM).

19. An apparatus for wireless communications, comprising:
 means for maintaining, at a user equipment (UE), a Public Land Mobile Network (PLMN) list;
 means for receiving an information request from a network, wherein the information request queries the UE for network capabilities supported by the UE;
 means for receiving an indication associated with a Universal Mobile Telecommunications System (UMTS) Terrestrial Radio Access Network (UTRAN) network type from the network;
 means for determining a type of radio access technology (RAT) supported by the network, in response to receiving the information request or the indication from the network, based on the PLMN list; and
 means for replying to the network with first network capabilities from multiple network capabilities supported by the UE, wherein the first network capabilities are associated with the type of RAT supported by the network, and wherein the multiple network capabilities supported by the UE include at least Time Division Synchronous Code Division Multiple Access (TDSCDMA) network capabilities or Wideband Code Division Multiple Access (WCDMA) network capabilities.

20. The apparatus of claim 19, wherein the information request includes neighbor channel information received in a system block.

21. The apparatus of claim 19, wherein the information request includes information indicating a presence of a Time Division Synchronous Code Division Multiple Access (TD-SCDMA) network or a Universal Mobile Telecommunications System (UMTS) network.

22. The apparatus of claim 19, wherein the type of RAT supported by the network is determined based on neighbor channel information received in a system information block, and the determining the network type is based on the neighbor channel information.

23. The apparatus of claim 19, wherein the means for determining the type of RAT supported by the network is based in part on determining whether the network uses time division duplexing or frequency division duplexing.

24. The apparatus of claim 19, further comprising means for receiving a command to handover to a target base station, and means for determining that the target base station supports the type of RAT supported by the network for communicating capabilities thereto.

25. The apparatus of claim 19, where the type of RAT supported by the network is determined based on a previous network type of a last RAT.

26. The apparatus of claim 19, wherein the PLMN list is updateable via over the air device maintenance procedures such as an open mobile alliance device maintenance protocol (OMA DM).

27. A non-transitory computer readable medium storing executable code for wireless communications, comprising:
    code for maintaining, at a user equipment (UE), a Public Land Mobile Network (PLMN) list;
    code for receiving an information request from a network, wherein the information request queries the UE for network capabilities supported by the UE;
    code for receiving an indication associated with a Universal Mobile Telecommunications System (UMTS) Terrestrial Radio Access Network (UTRAN) network type from the network;
    code for determining a type of radio access technology (RAT) supported by the network, in response to receiving the information request or the indication from the network, based on the PLMN list; and
    code for replying to the network with first network capabilities from multiple network capabilities supported by the UE, wherein the first network capabilities are associated with the type of RAT supported by the network, and wherein the multiple network capabilities supported by the UE include at least Time Division Synchronous Code Division Multiple Access (TD-SCDMA) network capabilities or Wideband Code Division Multiple Access (WCDMA) network capabilities.

28. The computer readable medium of claim 27, wherein the information request includes neighbor channel information received in a system block.

29. The computer readable medium of claim 27, wherein the information request includes information indicating a presence of a Time Division Synchronous Code Division Multiple Access (TDSCDMA) network or a Universal Mobile Telecommunications System (UMTS) network.

30. The computer readable medium of claim 27, wherein the type of RAT supported by the network is determined based on neighbor channel information received in a system information block, and the determining the network type is based on the neighbor channel information.

31. The computer readable medium of claim 27, wherein the code for determining the type of RAT supported by the network is based in part on determining whether the network uses time division duplexing or frequency division duplexing.

32. The computer readable medium of claim 27, further comprising code for receiving a command to handover to a target base station, and code for determining that the target base station supports the type of RAT supported by the network for communicating capabilities thereto.

33. The computer readable medium of claim 27, where the type of RAT supported by the network is determined based on a previous network type of a last RAT.

34. The computer readable medium of claim 27, wherein the PLMN list is updateable via over the air device maintenance procedures such as an open mobile alliance device maintenance protocol (OMA DM).

\* \* \* \* \*